Figure 1:
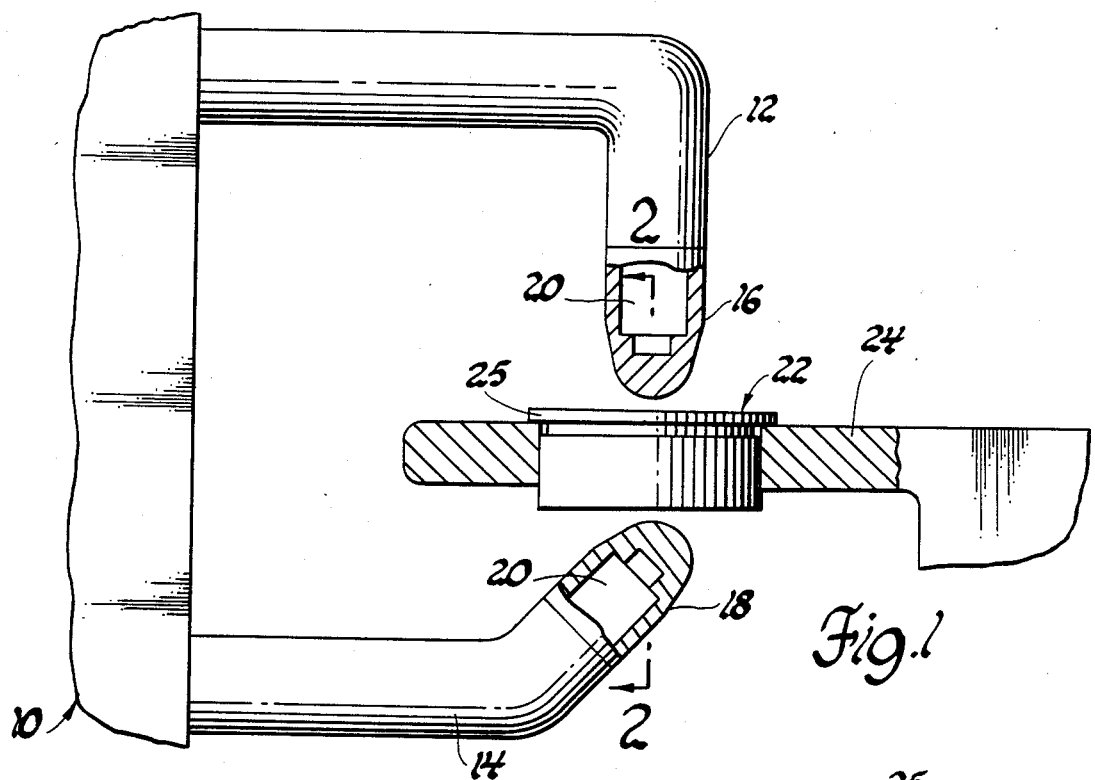

United States Patent [19]

Nedorezov

[11] Patent Number: 4,610,153

[45] Date of Patent: Sep. 9, 1986

[54] METHOD AND APPARATUS FOR DRESSING SPOT WELDING TIPS

[75] Inventor: Joseph V. Nedorezov, Troy, Mich.

[73] Assignee: General Motors Corporation, Detroit, Mich.

[21] Appl. No.: 682,684

[22] Filed: Dec. 17, 1984

Related U.S. Application Data

[63] Continuation-in-part of Ser. No. 515,394, Jul. 20, 1983, abandoned.

[51] Int. Cl.⁴ .................... B21D 22/14; B21D 53/00
[52] U.S. Cl. .................... 72/112; 29/402.19; 219/119
[58] Field of Search ............ 72/112, 115–118, 72/80, 467, 476; 29/882, 874, 825, 402.19, 90 R; 219/119, 120, 117.1; 76/DIG. 5

[56] References Cited

U.S. PATENT DOCUMENTS

| 75,961 | 3/1868 | Neuberger et al. ............ 72/476 |
| 2,848,804 | 8/1958 | Graves et al. ............ 72/112 |
| 2,930,289 | 3/1960 | Swarts . | |
| 3,045,741 | 7/1962 | Straubing ............ 72/112 |
| 3,195,221 | 7/1965 | Martin et al. ............ 72/80 |
| 3,470,720 | 10/1969 | Eklund et al. ............ 72/112 |
| 4,383,429 | 5/1983 | Ceccacci ............ 72/467 |

FOREIGN PATENT DOCUMENTS

| 524015 | 4/1956 | Canada ............ 29/882 |
| 187694 | 2/1964 | Sweden ............ 72/112 |
| 546792 | 7/1942 | United Kingdom ............ 29/90 R |
| 575596 | 2/1946 | United Kingdom ............ 219/119 |
| 575556 | 2/1946 | United Kingdom ............ 72/476 |

Primary Examiner—Daniel C. Crane
Attorney, Agent, or Firm—Warren D. Hill

[57] ABSTRACT

A tool for dressing copper spot welding electrode tips to a desired configuration comprises a disc with opposed concave faces formed at their centers in the desired configuration of the tips and adapted to be rotatably driven by a power tool. The dressing surfaces are uninterrupted surfaces of revolution and, therefore, contain no cutting edges. In operation, the electrode tips while mounted on a welding machine are clamped against a rotating dressing tool with normal welding pressure, so that as a result of the frictional engagement of the tool with the tip, the metal flows into conformity with the tool surface. Thus, no significant amount of metal is removed from the welding tip.

5 Claims, 5 Drawing Figures

METHOD AND APPARATUS FOR DRESSING SPOT WELDING TIPS

This is a continuation-in-part of application Ser. No. 515,394, filed July 20, 1983 abandoned.

This invention relates to a method and apparatus for dressing the tips of spot welding electrodes and, more particularly, to such a method and apparatus which shapes the welding tips to a desired configuration without significant metal removal.

Resistance spot welders use copper electrodes which deteriorate after repeated usage by flattening or mushrooming at their tips or points of contact with the workpieces being welded. The changing contact area, consequently, changes weld current density so that the quality of the welds also deteriorates. In addition, when a galvanized steel is the material being welded, the weld tips can stick to the material surface and can cause distortion of the workpiece or damage to the weld equipment. Some common practices for maintaining good weld quality, in spite of weld tip deterioration, include progressively increasing weld current as the tip contact area increases to sustain a proper weld current density, frequently changing the tips, or frequently dressing the tips. The expedient of increasing the current is inefficient in that high energy consumption is required and in addition, the current supply systee must be designed for current much higher than that required for the ideal weld operation. The practice of frequently changing the tips is an expensive maintenance item, whereas the periodic dressing of these tips when practiced in accordance with prior art teaching, has disadvantages as well. For example, commercially available tip dressers have cutting edges shaped in the pattern of the desired electrode configuration and are required to dress the tips by metal removal. After several dressings with such a cutting tool, the electrode is destroyed due to the amount of metal removed therefrom, and, in addition, the cutting action removes from the electrode tip a copper oxide film which normally builds up on a weld tip and which is useful to prevent the tip from sticking to a galvanized steel workpiece. Another disadvantage of the dressing tools with cutting edges is that such tools are expensive and due to dulling of the cutting edges, must be frequently sharpened or scrapped. Further, such commercially available cutters operate successfully only on weld guns where the weld tips are axially aligned, whereas, in practice welding machines often require at least one of the electrodes to be oriented at a substantial angle, say 45°, to the surface of the workpiece, thereby not being axially aligned with the other electrode.

It is therefore an object of this invention to provide a method and apparatus for dressing spot welding tips which will form and maintain a proper tip shape and will prolong the tip life. It is a further object of the invention to provide such method and apparatus to dress welding tips while preserving any oxide film on the tip. It is another object of the invention to provide such a method and apparatus to dress welding tips not axially aligned.

The method of the invention is carried out by rotating a tool having a dressing surface shaped to complement the desired tip shape, the surface being free of any cutting edge, and forcing the welding tip into frictional engagement with the tool surface to form the tip metal into the shape of the dressing surface, so that the welding tip assumes the desired shape and essentially no metal is removed from the tip.

The invention is further carried out by an apparatus comprising a dressing tool for electrode tips comprising a rotatable disc having a concave dressing face defining a surface of revolution with no cutting edge, the center portion of the face formed in the desired shape of the welding tip so that forceful application of the welding tip to the rotating tool causes the tip to conform to the shape of the dressing surface of the tool without removing metal.

Figure 2:
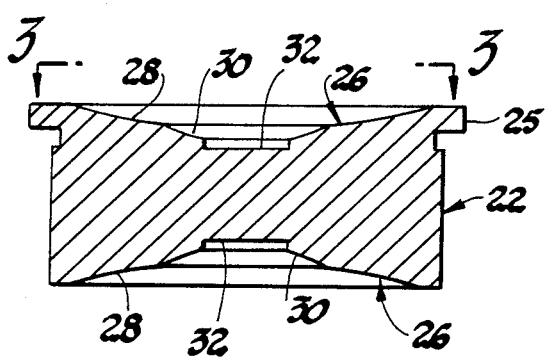
Figure 3:
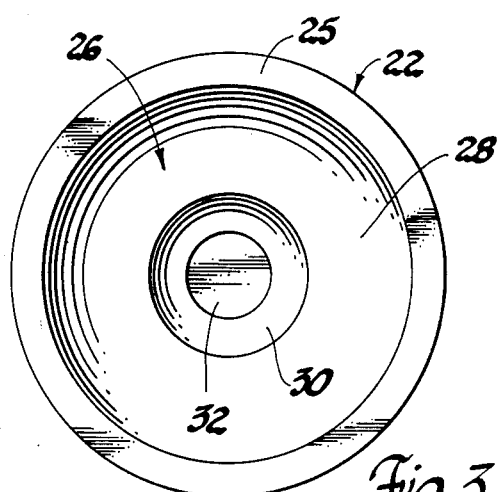
Figure 4:
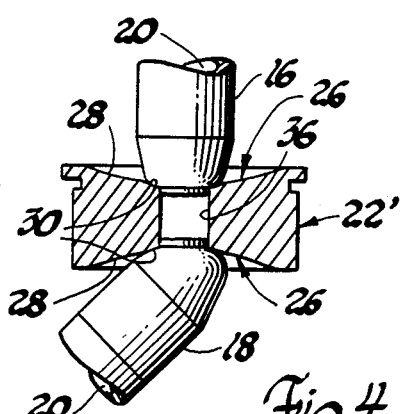
Figure 5:
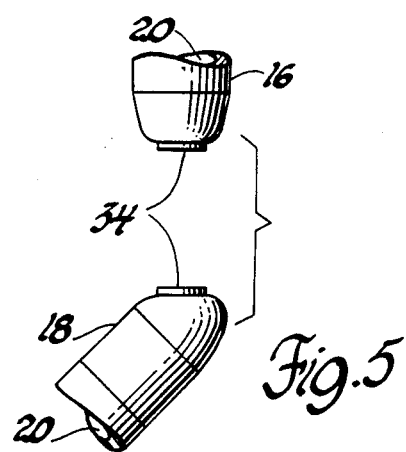

The above and other advantages of the invention will be more fully described in the following specification taken in conjunction with the accompanying drawings wherein like reference numerals refer to like parts, and wherein:

FIG. 1 is an elevational view of a dressing tool according to the invention associated with a welding gun having electrodes to be dressed, FIG. 2 is an enlarged cross-sectional view of a dressing tool according to the invention taken along line 2—2 of FIG. 1, FIG. 3 is a plan view of the dressing tool taken along line 3—3 of FIG. 2, FIG. 4 is a cross-sectional illustration of a second embodiment of a dressing tool according to the invention performing an operation on welding tips according to the method of the invention, and FIG. 5 is a view of welding tips after the completion of the dresssing operation according to the invention.

Referring to the drawings, FIG. 1 shows a portion of a welding machine 10 having upper and lower arms 12 and 14 carrying replaceable copper welding tips 16 and 18, respectively. Each of the tips comprises a cylindrical hollow body portion defining a cavity 20 supplied with cooling water from passages, not shown, and each tip terminates in a solid tapered section having a rounded end. A dressing tool 22, thin enough to fit into the welding tip spacing, is positioned in the gap between the tips and held for rotation by a commercially available power tool 24, which is shown partly in section. The driving mechanism of the tool 24 is not shown, since it is already well known to those skilled in the art.

As is better shown in FIGS. 2 and 3, the dressing tool 22 is a disc shaped element having a flange 25 extending radially along one edge thereof and has a pair of opposed concave faces 26 which comprise the dressing surfaces of the tool. In the preferred embodiment, each face is an uninterrupted surface of revolution which has a marginal concave zone 28 defined by a large radius of curvature contiguous with an inner concave portion 30 having a smaller radius of curvature. A shallow, nearly cylindrical depression 32 with slightly tapered sides is formed at the center of each dressing surface. The dressing surface is smooth with no abrasive or other cutting edges.

In another embodiment, as shown in FIG. 4, the tool 22' is the same as the tool 22, described above, except that instead of the depression 32 in each face there is an axial bore 36 extending between the faces.

In operation, the tool 22 or 22' is placed between the weld tips 16 and 18 as shown in FIGS. 1 and 4 with the depressions 32 or bore 36 aligned between the tips. The tool 22 or 22' is rotated by power driver 24 at a speed of, say, 1500 rpm, and then the welding electrodes are closed with normal force as if an actual weld were to take place, but no current is applied. The welding force exerted by each tip against the tool 22 is on the order of 800 pounds. Under those conditions, with the tips frictionally engaging the rotating tool, the tips are formed into the shape of the dressing surface as shown in FIG. 4. Thus rotating frictional engagement of a tip and a tool causes metal flow or displacement similar to that in a spinning operation. Since the dressing surface is shaped complementary to the desired final configuration of the weld tip, the tips then assume that desired shape. This dressing operation may be applied to new weld tips 16 and 18 as illustrated in FIG. 1, or it may be applied to redress tips wihch after many welds require redressing. The preferred shape of the electrodes, as shown in FIG. 5, has a very small button 34 on each tip aligned with the button of the other tip to accurately define a workpiece contact area. It has been found that the small button withstands repeated weld operations without significant wear or deformation, as opposed to standard domed weld tips which tend to mushroom.

The tool 22 has the ability to form the button 34 with a smooth end surface in the shape of the depression 32. The tool 22' can form the same kind of button 34 except that the end surface will not be finished. The bore 36 diameter will determine the button diameter. In either case, the tip region surrounding the button will be formed into the shape of the concave portion 30. The tool 22 can gradually build up a residue of electrode material or various foreign materials in the depression 32 so that after many dressing operations the effective depth of the depression 32 is reduced or the shape is changed so that cleaning is required to restore the desired dimensions. This does not occur in the case of tool 22' with the axial bore 36 so that the tool 22' is maintenance free. In any event, the tips are readily dressed by the tool 22 or 22' to reform the button configuration without any significant metal removal from the tip so that the tip life is not decreased as in the case where a cutting dresser is used, but rather the tip life is increased by virtue of optimizing the tip configuration. Moreover, the weld quality is maintained at a high level and excessive weld currents are not required, unlike the case of a mushrooming tip.

As a specific example of a tool 22 which is used in the dressing of a conventional domed or tapered copper tip having a body ⅝ inch in diameter, the tool has a thickness of 0.5 inch and a diameter at its flange of 1.25 inch. Each depression 32 is 0.25 inch in diameter and 0.02 or 0.03 inch deep. The radius of curvature of the inner concave portion 30 is 2 inches while the radius of curvature of the outer zone 28 is somewhat larger. The material of the tool is mild steel, carbon steel, or hardened steel. The tool 22' is the same except for the bore 36 which has a diameter of 0.25 inch. Due to the generally concave shape of each face, the tool 22 or 22' is automatically centered with respect to the welding tips when the tips are applied to the rotating tool. Thus, if the initial contact of the tips is at the outer concave zone 28 or the inner zone 30, the slope of the surface will cause the tips to slide toward the center depression 32 or bore 36 to center the tool. Hence, the two tips are dressed simultaneously in welding position and the buttons 34 will be formed in correct alignment. Due to the shallow concavity of the surface, one or both of the tips may be formed at an angle as illustrated by tip 18, in FIG. 1. Thus, substantially any desired angle of the weld tip may be used with the dressing tool, thereby assuring the usefulness of the tool in a wide variety of welding applications. A power tool 24 successfully employed for this operation is an Aro Corp. Electrode Dresser Model No. B040-E.

The welding gun 10 and the power tool 24 may be manually controlled devices or either of them or both may be machine controlled. It has been found that when the power tool 24 is at a stationary position and the welding gun 10 is carried by a robot, then the robot control can, after a predetermined number of welds, say 500, move the welding gun to the dressing tool, energize the dressing tool motor and apply the welding tips to the dressing tool for dressing the tips without human operator intervention. In practice, it has been found that dressing time on the order of 3 or 4 seconds is adequate to form or maintain the shape of the weld tips. Thus, the dressing operation normally can be performed during the change of workpieces at the welding station.

It will thus be seen that according to the invention, a rotating dressing tool shaped to the desired configuration of the welding tip and having no cutting edges is effective to maintain the weld tips in a desired shape or to initially form the tips to the desired shape without any significant removal of metal. In practice, it has been found that only a film residue of the copper tip material is left on the tool and no chips, powder, or other debris from the copper tip are formed during the dressing operation.

It is also seen that the method of rotating a tool having a dressing surface which is a surface of revolution having no cutting edges and forcing the welding tips against the dressing surface is effective to form the desired shape of the weld tips.

The embodiments of the invention in which an exclusive property or privilege is claimed are defined as follows:

1. The method of dressing the tip of a spot welding electrode subject to accumulating an oxide film without a significant amount of metal or oxide removal comprising the steps of;

rotating a tool having a smooth dressing surface defining a continuous surface of revolution configured to complement the desired electrode tip shape, and forcing the tip into direct frictional engagement with the rotating tool surface to effect electrode metal flow into the shape of the dressing surface while preserving the oxide film on the tip, whereby the electrode tip is dressed with essentially no material removal.

2. The method of simultaneously dressing the tips of a pair of spot welding electrodes on a welding gun, the tips being subject to accumulating an oxide film, without a significant amount of metal or oxide removal comprising the steps of;

rotating a tool having a pair of opposed smooth dressing surfaces each defining a continuous surface of revolution configured to complement the desired electrode tip shape, and clamping the electrode tips across the tool to force the electrode tips into direct frictional engagement with the rotating tool surfaces and effect electrode metal flow into the shape of the dressing surface while preserving the oxide film on the tip, whereby the electrode tips are dressed with essentially no material removal.

3. A rotatable dressing tool for shaping a pair of spot welding electrode tips while mounted on a welding gun consisting of:

a disc sufficient thin to fit between the electrode tips and having opposed concave faces which face away from one another for directly engaging the electrode tips, each face being an uninterrupted surface of revolution about the axis of rotation, and the outer portion of each face being sloped inwardly to promote alignment of the electrodes with the center of the face when engaged by an electrode, and the center portion of each face being formed in the desired shape of the electrode tips, and means for rotating the disc about the axis of rotation, whereby frictional engagement of the disc faces with the electrodes causes metal flow to shape the electrode tips to conform to the tool shape without significant removal of metal.

4. A rotatable dressing tool for shaping a pair of spot welding electrode tips while mounted on a welding gun comprising:

a disc sufficiently thin to fit between the electrode tips and having opposed concave faces, each face defining an uninterrupted surface of revolution about the axis of rotation, an axial bore connecting the faces, the center portion of each face surrounding the bore being formed in the desired shape of an electrode tip, and means for rotating the disc about the axis of the rotation, whereby frictional engagement of the tool faces with the electrodes causes metal flow to shape the electrode tips to conform to the tool shape without significant removal of metal.

5. A rotatable dressing tool for shaping a pair of spot welding electrode tips while mounted on a welding gun consisting of;

a disc sufficiently thin to fit between the electrode tips and having opposed concave faces which face away from one another for directly engaging the electrode tips, each face being an uninterrupted surface of revolution about the axis of rotation, and the outer portion of each face being sloped inwardly to promote alignment of the electrodes with the center of the face when engaged by an electrode, the center portion of each face having a depression formed in the desired shape of the electrode tips, and means for rotating the disc about the axis of rotation whereby frictional engagement of the tool faces with the electrodes causes metal flow to shape the electrode tips to conform to the tool shape with button portions corresponding to the depressions without significant removal of metal.

* * * * *